United States Patent [19]
Rubens

[11] 3,878,133

[45] Apr. 15, 1975

[54] CUSHIONING AND MATERIALS THEREFOR

[75] Inventor: Louis C. Rubens, Midland, Mich.

[73] Assignee: The Dow Chemical Company, Midland, Mich.

[22] Filed: Dec. 20, 1973

[21] Appl. No.: 426,884

Related U.S. Application Data

[63] Continuation-in-part of Ser. No. 281,524, Aug. 17, 1972, abandoned.

[52] U.S. Cl....... 260/2.5 BE; 161/159; 260/2.5 AK; 260/2.5 B
[51] Int. Cl........................ C08g 22/44; C08g 41/04
[58] Field of Search ...... 260/2.5 BE, 2.5 AK, 2.5 B; 161/159

[56] References Cited
UNITED STATES PATENTS

| | | | |
|---|---|---|---|
| 3,288,731 | 11/1966 | Ingram | 260/2.5 B |
| 3,505,249 | 4/1970 | Skochdopole | 260/2.5 B |
| 3,509,079 | 4/1970 | Hyde | 260/2.5 BE |
| 3,607,797 | 9/1971 | Rubens et al. | 260/2.5 BE |
| 3,662,043 | 5/1972 | Rubens | 260/2.5 BE |
| 3,767,744 | 10/1973 | Holl | 260/2.5 B |

*Primary Examiner*—Donald E. Czaja
*Assistant Examiner*—C. Warren Ivy
*Attorney, Agent, or Firm*—Robert B. Ingraham

[57] ABSTRACT

An improved composite cushioning material is prepared by admixing urethane foam components and expandable lightly cross-linked beads of a styrene/acrylonitrile polymer. A resilient product is obtained which undergoes many flexing cycles without losing its resilient nature.

28 Claims, No Drawings

CUSHIONING AND MATERIALS THEREFOR

This application is a continuation-in-part of my copending application Ser. No. 281,524, filed Aug. 17, 1972, now abandoned.

A variety of composite foams are known and are set forth in U.S. Pat. Nos. 2,958,905; 2,959,508; 3,503,840 and 3,607,797. Plastic foams are employed for a variety of purposes varying from structural applications to comfort cushioning. One particularly convenient means of preparing comfort cushioning is to incorporate within the self-reacting foam forming mixture, such as an expandable urethane mixture, a number of expandable granules which expand to provide a closed cell structure within a matrix of open cell polyurethane. Polyethylene terephthalate-containing structures have been prepared and are described in U.S. Pat. No. 3,503,840 wherein the expanded particle is incorporated within the urethane matrix to provide a composite foam suitable for comfort cushioning. The addition of the closed cell foam particles to the open cell urethane foam matrix provides a foam that is initially soft and when compressed by the application of pressure increases in resistance to that pressure as the closed cell components are compressed, thus giving a foam which does not "bottom out" in the manner that an open cell urethane foam does. Styrene-type polymers generally have not been found suitable or desirable for such an application, yet the use of a polymer that would expand at the temperatures normally obtained in casting polyurethane cushions is extremely desirable. Styrene polymers lightly cross-linked are known to be suitable for the preparation of crash padding and simialr cushioning applications. Generally the resultant polystyrene particles within the composite foam such as described in U.S. Pat. No. 3,607,797 do not have sufficient resiliency for comfort cushioning. Attempts to employ polystyrene particles in such composite cushioning have in general been unsuccessful as under repeated flexing the particles appear to disintegrate. It is believed that the cell walls fracture during flexing and that the particles are converted generally to an open celled structure. Resilient polystyrene particles can be prepared but when subjected to curing conditions for urethane foam unsatisfactory physical properties are obtained.

It would be desirable if there were available an improved composite foam employing urethane and a styrene polymer.

It would also be desirable if there were available an improved composite foam utilizing a styrene polymer wherein the composite foam resists repeated flexing and compression of the styrene polymer particles.

It would further be desirable if there were available an improved method for the preparation of composite foams which permitted inclusion of an unfoamed particle, the particle foaming during the cure of the matrix material.

It would also be desirable if there were available an improved expandable styrene polymer particle suitable for the preparation of comfort foams.

These benefits and other advantages of the present invention are obtained in a composite foam structure, the composite foam structure comprising a matrix of an open cell flexible foam, the matrix having dispersed through at least a selected portion thereof a plurality of resilient flexible closed cell foam particles, said foam particles being a polymer of about 8 to 40 weight percent acrylonitrile and from about 92 to 60 weight percent styrene, and beneficially from about 20 to 30 weight percent acrylonitrile and from about 80 to 70 weight percent styrene.

Also contemplated within the scope of the present invention is an improved method for the preparation of composite foam materials wherein a self-reacting exothermic open cell foam forming commposition is admixed with a closed cell foaming or expanding component and the composite cast or molded into a desired configuration, the improvement which comprises employing as the closed cell foaming component a plurality of expandable styrene/acrylonitrile particles, the particles being a polymer of from about 8 to 40 weight percent acrylonitrile and from about 92 to 60 weight percent styrene, the particles having a volatile fluid foaming agent that is a poor solvent for the polymer and boils at a temperature below about 110°C.

The polyurethane foam matrix can be any of the flexible polyether polyol urethane foams having predominantly open cells; i.e., at least 50 percent and preferably 80 percent or more open cells, and of densities that may range from about 0.8 to 3.0 pounds per cubic foot of the foam. Such foams are prepared by reaction of a polyisocyanate; e.g., tolylene ddiisocyanate or polymethylene polyphenyl isocyanate, with a polyether polyol such as the adduct of propylene oxide, or propylene oxide and up to about 20 percent by weight of ethylene oxide or butylene oxide, with an aliphatic polyhydric alcohol having from two to eight hydroxyl groups in the molecule and which adduct has an OH equivalent weight of from 500 to 2000. The polyurethane foam may be obtained either in a one stage process or by way of a "prepolymer"; i.e., an intermediate reaction product of the polyether polyol and the polyisocyanate.

The relative proportions by volume of the components of the composite cellular material vary from about 50 to 99 volume percent of the flexible open cell polyurethane foam matrix and from about 1 to 50 volume percent of the expandable styrene/acrylonitrile particles. For most desirable comfort cushioning applicaations; that is, applications where the foam will be disposed generally next to a person sitting, such as in a chair, it is usually desirable to utilize from about 85 to 99 volume percent of the flexible polyurethane open cell foam matrix and from about 1 to 15 volume percent of the expanded styrene/acrylonitrile particles. For many applications it is often desired to employ a stiffer foam; for example, a stiffer foam may be used to support a softer foam in the preparation of furniture or seating facilities wherein the major supporting structure is of all foam construction, and beneficially is also resilient but of much stiffer foam than that employed for direct cushioning adjacent the body. In such instances, it is often desirable to employ the flexible open cell polyurethane matrix in about 85 to 50 volume percent and from about 15 to 50 volume percent of the expanded styrene/acrylonitrile particles. The volume percent of the styrene/acrylonitrile particles oftentimes can be increased by heating the composite material in an atmosphere of nitrogen or other gas which permeates the closed cell particles. Heating in air can generally accomplish this. However, a substantial fire hazard may exist. Generally if the composite material is maintained at temperatures within the range of 115° to about 150°C. for periods ranging from up to two hours at the lower portion of the temperature range and from up to about 5 to 20 minutes in the higher temperature range, significant expansion of the closed cell particles will occur. The time of exposure as well as being temperature dependent is also dependent on the size of the composite article being treated unless heated gas is forced through the foam matrix to rapidly raise the temperature of the expandable particles disposed in the innermost region. Similar post-expansion can be employed for the expanded particles alone without the foam matrix. The particles alone find beneficial application as filler for cushions, furniture, toys and like applications which require resilient stuffing.

In practice for the production of composite cellular materials in accordance with the invention, a liquid mixture of the ingredients of a polyurethane foam recipe, including the polyether polyol, water, surfactant, catalyst and/or a volatile blowing agent; e.g., pentane, trichlorofluoromethane or 1,1,2-trichloro-2,2,1-trifluoroethane, if desired, is prepared, to which is added the desired proportion of the thermally expandable lightly cross-linked copolymer granules. Thereafter, the polyisocyanate is added and rapidly mixed with the materials. The resulting mixture can be foamed in any suitable way such as by pouring into a mold; e.g., a paperboard box mold, or onto a moving belt in a trough mold and is allowed to expand or foam to produce the composite cellular product.

Expandable synthetic thermoplastic resinous particles and their preparation is well known in the art and are described in U.S. Pat. Nos. 2,744,291; 2,799,062 and 2,787,809. U.S. Pat. No. 2,848,427 describes cross-linked or thermocollapse resistant particles. Such thermocollapse resistant particles are expandable particles which will expand on heating to at least 20 times their original volume ($V_F/V_S = >20$) and remain stable; that is, will not shrink or collapse when heated in air for 10 minutes at a temperature of at least 40°C. above the glass temperature of a non-crosslinked or linear polymer of like composition. In the preparation of such expandable particles a wide variety of foaming agents may employed including halocarbons, hydrocarbons, halohydrocarbons and the like. Such blowing agents are set forth in U.S. Pat. No. 2,848,427 and 2,848,428. Generally, expandable particles in accordance with the present invention are cross-linked before, after or during impregnation with blowing agent. Such cross-linking may be induced by well known cross-linking means for preformed polymers; that is, by means or method which are capable of introducing cross-linking into a mass or body of linear polymer. Cross-linking materials and reactions for various polymer systems are well known in the art and are discussed at great length in the Encyclopedia of Polymer Science & Technology, Volume 4, pages 331–414, John Wiley & Sons, Inc., 1966, which is herewith incorporated by reference. For example: employing styrene/acrylonitrile products, suitable multi-functional cross-linking compounds are dipropylene glycol, bis(chloromethyl)biphenyl oxide epoxy resins such as the polyglycidyl ether of bisphenol A; whereas suitable comonomers to provide reactive sites for crosslinking are vinylbenzyl chloride, glycidyl methacrylate and the like.

Polymers in accordance with the present invention are polymers of styrene and acrylonitrile containing from about 8 to 40 weight percent acrylonitrile and from about 92 to 60 weight percent styrene, and beneficially from about 20 to 30 weight percent acrylonitrile and from about 80 to 70 weight percent styrene. The particles are sufficiently cross-linked that they exhibit a swelling ration of from about 10 to 50 as measured in dimethylformamide at 25°C., with the further limitation that the swollen polymer form a coherent gel. Swelling ratio is determined by measuring the weight of a polymer particle, immersing the polymer particle in dimethylformamide at 25°C. until equilibrium swelling is reached, removing the swollen gel from the dimethylformamide, weighing the swollen gel. The swelling ratio ($W_g/W_s$) is then the ratio of the weight of the swollen gel ($W_g$) to the weight of the unswollen particle ($W_s$). It is critical to the practice of the present invention that the swelling ratio be from about 10 to 50. If the swelling ratio is less than about 10, generally insufficient foaming occurs; if greater than 50, insufficient thermocollapse resistance is obtained. Thus, the particular method or means of introdducing the cross-links in the styrene/acrylonitrile in accordance with the present invention is not critical. Such cross-linkage may be obtained during the formation of the particle by the inclusion of a cross-linking agent which is copolymerized with the monomers. Cross-linking may be subsequently introduced prior to impregnation with blowing agent, after impregnation with blowing agent or during impregnation with blowing agent. High energy radiation is also useful in providing a copolymer having the desired degree of cross-linking. Such a process is described in U.S. Pat. No. 2,952,594, herewith incorporated by reference. In accordance with the hereinbefore cited references, blowing agent may be incorporated within the particle during polymerization in polymerization system. Beneficially such cross-linking is accomplished by adding a small amount of a monomer containing multiple ethylenic groups such as divinylbenzene, ethylene dimethacrylate, trimethylol propane triacrylate and the like to the styrene/acrylonitrile monomer mixture. The styrene/acrylonitrile polymers employed in the present invention are readily cross-linked by introducing a Friedel Crafts catalyst such as boron trifluoride into the polymer with the introduction of the blowing agent, thereby providing simultaneous impregnation and cross-linking. If desired, a reactive agent is incorporated within the molecules of the polymer body by either copolymerization during formation of the polymer or by addition prior to impregnation with the blowing agent and a suitable catalyst or similar material to promote cross-linking. For example: styrene/acrylonitrile resins are mixed in a melt or heat plastified condition with an agent which can be caused to effect cross-linking, or a chemically reactive monomer or polymer may be incorporated during or after polymerization. Utilizing styrene/acrylonitrile resins, compounds such as dipropylene glycol, bis(chloromethyl)biphenyl oxide are employed. Other reactive compounds include the so-called epoxy resins beneficially of low molecular weight which, on the introduction of a suitable catalyst such as borontrifluoride, will provide the desired cross-linking function. Suitable comonomers which provide active sites for cross-linking when polymerized with a styrene/acrylonitrile monomer mixture include vinylbenzyl chloride, glycidyl acrylate, glycidyl methacrylate, hydroxy ethylacrylate, hydroxy propylacrylate, hydroxy ethyl methacrylate, hydroxy propyl methacrylate. Polymers containing such active sites can be heat plastified and molded and/or extruded to desired shapes and subsequently impregnated with blowing agent and cross-linked. Benzylic chlorides such as vinylbenzyl chloride provide active cross-linking sites which are useful with basic catalysts such as organic amines, typically trimethyl amine for the formation of a quaternary bridge or cross-link. Epoxy resins which are particularly suitable for use with styrene-/arrylonitrile polymer systems include liquid epoxy resins such as the diglycidyl ether of bisphenol A, dipropylene glycol, bis(chloromethyl)biphenyl oxide and the like such as Lewis acids (e.g., borontrifluoride), which readily respond with a Friedel Crafts catalyst to provide cross-linking which may occur either before or during impregnation of the blowing agent. Beneficially, cross-linking of the polymer is carried out at a temperature of from about −20° to +40°C. of the glass temperature of the polymer being treated. Such cross-linking may be carried out employing a suspending medium which is non-reactive with the cross-linking means and is saturated with the blowing agent being impregnated. However, it is particularly advantageous to conduct the cross-linking and impregnation simultaneously under generally anhydrous conditions and in the absence of a liquid suspending medium, and preferably under conditions which prevent the adhesion of particles of the polymer together. For example, employing styrene/acrylonitrile polymers having polymerized therein minor amounts of an ethylenic comonomer having a second functional group which is present in the copolymer or a suitable polyfunctional additive such as the diglycidyl ether of bisphenol A, temperatures of from about 60° to 120°C. are beneficial, and preferably from about 70° to 100°C. The particles or bodies being impregnated may be individually supported during impregnation such as on a screen or tumbled in the presence of an anti-sticking agent such as finely divided talc or sodium chloride which is readily removed by water washing after the impregnation is complete. Generally, it is desirable that such washing be done at a temperature below the temperature at which the particles foam. The expandable particles may be extruded and re-pelletized. However, much of the cross-linking structure is destroyed or altered by mechanical working in a heat plastified condition and the resultant product is not useful in the present invention.

Beneficially, the particles for the practice of the present invention may be of any desired shape. However, for most applications it is beneficial to employ generally spherical particles. Such particles should have a minimum dimension of about 0.05 millimeter and usually it is undesirable to employ particles larger than about 5 millimeters. For most applications, particles from about 0.3 to about 3 millimeters in diameter are most advantageous. On foaming, the expandable particles generally form very small closed cells, usually 0.1 millimeter or less in diameter.

The following examples serve to illustrate the invention but should not be construed as limiting.

EXAMPLE 1

A plurality of polymer samples are prepared by copolymerizing styrene and acrylonitrile (VCN) with a small amount of divinylbenzene (DVB) and benzoyl peroxide ($Bz_2O_2$) in ampules having an inside diameter of 2 millimeters for a period of 6 days at 80°C. and for an additional 2 days at 125°C. The resulting rods are cut into pellets 2 millimeters in length and the swelling ratio determined. Another portion of the pellets is impregnated with a 1:1 by weight mixture of dichlorodifluoromethane and trichlorofluoromethane in sealed ampules for a period of 24 hours at 120°C. Samples of the resultant expandable particles are heated in a circulating air oven at a temperature of 150°C. for periods of one and ten minutes. After heating, the samples are cooled to room temperature, the volume measured and the ratio of foam volume to original or unexpanded solid volume ($V_F/V_S$) determined. The foamed samples are subsequently evaluated for resiliency by placing a particle upon a flat surface and compressing the particle to 10 percent of its initial thickness. The stress is released and the compression repeated for 10 cycles and the percentage recovery to original height measured. The percentage recovery is an indication of the resilience of the particle. The results are set forth in the following Table I.

TABLE I

| SAMPLE | MONOMER COMPOSITION[1] | | | INITIAL[2] | BLOWING[3] AGENT (wt. %) | 150°C. FOAMING[4] $V_F/V_S$ | | "RESILIENCE"[5] (% Recovery) FOR FOAMS | | $W_g/W_s$[6] |
|---|---|---|---|---|---|---|---|---|---|---|
| | % STYRENE | % VCN | % DVB | % $Bz_2O_2$ | | 1 min. | 10 min. | 1 min. | 10 min. | |
| 1 | 99.96 | 0 | 0.02 | 0.05 | 18.7 | 15 | 6 | NR | NR | 17.8 |
| 2 | 91.96 | 8 | 0.02 | 0.05 | 18.0 | 35 | 8 | 47 | NR | 27.8 |
| 3 | 83.96 | 16 | 0.02 | 0.05 | 17.9 | 59 | 85 | 81 | 88 | 29.1 |
| 4 | 75.96 | 24 | 0.02 | 0.05 | 18.1 | 42 | 60 | 77 | 85 | 21.2 |
| 5 | 67.96 | 32 | 0.02 | 0.05 | 17.6 | 38 | 46 | 74 | 83 | 17.7 |
| 6 | 59.96 | 40 | 0.02 | 0.05 | 17.7 | 20 | 25 | 70 | 74 | 18.2 |
| 7 | 99.92 | 0 | 0.04 | 0.05 | 18.9 | 28 | 44 | 34 | 46 | 8.5 |
| 8 | 91.92 | 8 | 0.04 | 0.05 | 18.0 | 58 | 80 | 76 | 84 | 15.7 |
| 9 | 83.92 | 16 | 0.04 | 0.05 | 18.2 | 52 | 52 | 84 | 88 | 13.8 |
| 10 | 75.92 | 24 | 0.04 | 0.05 | 17.9 | 26 | 50 | 80 | 84 | 11.9 |
| 11 | 67.92 | 32 | 0.04 | 0.05 | 18.1 | 20 | 32 | 69 | 78 | 11.3 |
| 12 | 59.92 | 40 | 0.04 | 0.05 | 17.6 | 7 | 10 | 33 | 40 | 11.1 |

FOOTNOTES:
1. Monomer Composition - monomer used for preparing 2 millimeter cast rods in sealed ampules.
2. Benzoyl peroxide concentration based upon total monomer; divinyl benzene added as a 50:50 mixture with ethyl vinyl benzene.
3. Total weight percent 50:50 dichlorodifluoromethane/trichlorofluoromethane mixture in the polymer after impregnation for 24 hours at 120°C. in sealed ampules under autogeneous pressure.
4. $V_F/V_S$ ratio of volume of foamed particle to solid particle after heating in oven for one and 10 minutes at 150°C.
5. Resiliency test on foam particles prepared by heating for one and 10 minutes at 150°C. NR indicates recovery is less than 15 percent.
6. Weight of gel/weight of solid.

In the foregoing Table, Samples 3–6 and 8–12 exhibit a coherent gel when evaluated for swelling in dimethylformamide in accordance with the hereinbefore delineated procedure. Manual evaluation of foamed particles of Samples 3–6 and 8–12 indicates a resilient, tough particle that shows exceptional resistance to mechanical degradation by flexing. By way of comparison, Samples 1 and 2 when flexed (rolled) between thumb and forefinger, quickly disintegrate. Particles of Sample 7 disintegrate less rapidly, while the particles of remaining Samples show remarkable resistance, resilience and toughness. Such particles are eminently satisfactory where a loose fill resilient packing material is desired such as cushions, pillows and in instances where particularly tough resilient dunnage is desired.

EXAMPLE 2

In a manner similar to the foregoing example, a copolymer is prepared of 70 weight percent styrene; 30 weight percent acrylonitrile; 0.025 weight percent divinylbenzene, based on the combined weight of the styrene and acrylonitrile; 0.1 weight percent benzoyl peroxide (based on the styrene/acrylonitrile) is employed as a catalyst. The monomer is polymerized in sealed glass ampules having a diameter of 1 millimeter for a period of 48 hours at 80°C. and an additional 48 hour period at 120°C. The polymerization is conducted in the presence of 30 weight percent trifluorotrichloroethane of commercial purity. After polymerization the ampules are removed from the rods and the rods cut into 1 millimeter lengths to obtain particles having a diameter and length of about 1 millimeter. The particles are placed in a circulating air oven at 150°C. for periods of 10 minutes and 60 minutes. After 10 minutes the ratio of foam volume to solid volume ($V_F/V_S$) is 38 and after 60 minutes is 69. Employing the hereinbefore described test for resilience the particles are foamed for 10 minutes; that is, exposed in the air oven for 10 minutes, and shown an 82 percent recovery, while those foamed for 60 minutes show an 87 percent recovery. A portion of the hereinbefore prepared particles is formed into a composite foam utilizing a foamable polyurethane mixture. The polyurethane mixture is as follows, values given are parts by weight:

| | |
|---|---:|
| Polyol (about 3000 molecular weight polypropylene oxide triol) | 65.612 |
| Water | 2.624 |
| Stannous octoate catalyst | 0.180 |
| Triethylene diamine | 0.196 |
| DC 192* silicone surfactant (sold by Dow Corning Corporation) | 0.524 |
| Toluene diisocyanate | 30.864 |

*DC 192 is a non-hydrolyzable product obtained by reacting silicon fluid with allyl alcohol polyether and contains linkages such as Si—CH$_2$—CH$_2$—CH$_2$—OR.

The polyurethane components are rapidly mixed with the expandable particles and after 5 seconds mixing the urethane foam mixture containing 10 percent by weight of the expandable beads is poured into an open top box mold having inside dimensions of 12×12×12 inches and oriented to provide a generally rectangular casting. A thermocouple is embedded in the curing urethane foam/expandable particle mixture and indicates a peak curing temperature of 129°C. The resultant molded urethane foam composite has a density of 1.85 pounds per cubic foot. Examination of the composite foam indicates that it is 89 volume percent open celled polyurethane foam, 11 percent beads or closed cell styrene/acrylonitrile foam. The beads removed from the urethane composite show a density of 1.34 pounds per cubic foot and a resiliency of 82 percent. A sample of the composite foam is cut which has a diameter of 8 inches and is 3 inches thick. The sample is compressed to 30 percent of the initial thickness in a tensile compression testing machine wherein the compression occurs at a speed of 2 inches per minute. The load is removed and the sample given one minute to recover and subsequently recompressed to 30 percent of its original thickness for a plurality of cycles. The force exerted by the compressing crosshead is recorded in pounds per square inch and is set forth in the following Table.

TABLE II

| | % COMPRESSION | PRESSURE |
|---|---|---|
| First Compression Cycle | 25 | 1.0 |
| | 50 | 2.3 |
| | 60 | 3.6 |
| | 70 | 5.7 |
| Tenth Compression Cycle | 25 | 0.80 |
| | 50 | 2.0 |
| | 60 | 3.1 |
| | 70 | 4.8 |
| 100th Compression Cycle | 25 | 0.75 |
| | 50 | 1.8 |
| | 60 | 2.9 |
| | 70 | 4.5 |

*Pounds per square inch

For purposes of comparison, samples of the polyurethane foam and sampls of the polyurethane foam containing expanded crosslinked polystyrene are run. Each exhibits poor performance; that is, a much greater loss of physical properties on repeated compression.

EXAMPLE 3

A copolymer of about 70 parts by weight styrene and 30 parts by weight acrylonitrile is prepared using 0.2 part by weight divinylbenzene and 0.4 part by weight benzoyl peroxide by suspension polymerization in water containing 0.2 weight percent hydroxypropyl methyl cellulose as a suspension stabilizer. The oil to aqueous phase ration in 1:1. Polymerization is carried out for 48 hours at 82°C. The polymer is recovered from the reactor by filtering and washing and is subsequently impregnated at a temperature of about 120°C. for 24 hours employing 19.8 weight percent blowing agent, based on the weight of the polymer. The blowing agent is a 1:1 by weight mixture of dichlorodifluoromethane and trichlorofluoromethane. A portion of the resultant polymer particles are foamed in a circulating air oven at 150°C. for varying periods of time and the foam volume to initial volume ratio determined and the particles heated in air are evaluated for resiliency in accordance with the procedure of Example 1. The results are set forth in Table III which follows.

TABLE III

| FOAMING TIME* | $V_F/V_S$ | "RESILIENCE" (% Recovery) (minutes) |
|---|---|---|
| 1 | 30 | 76 |
| 10 | 52 | 84 |
| 20 | 53 | 82 |
| 30 | 52 | 85 |

*at 150°C. - minutes

A portion of the expandable particles are employed to make a composite foam containing about 8 weight percent of the expandable beads. The polyurethane composition utiized is as follows, values given are parts by weight:

| | |
|---|---|
| Polypropylene oxide triol (about 3800 molecular weight) | 62.25 |
| Water | 2.50 |
| Trichlorofluoromethane | 5.00 |
| Stannous Octoate | 0.12 |
| Triethylene diamine | 0.05 |
| Silicone surfactant (DC 192) | 0.05 |
| Toluene Diisocyanate | 29.58 |

The expandable beads are added to the polypropylene oxide triol component and the materials mixed in a Martin-Sweets polyurethane foam machine and cast into a block measuring about 3×3×2 feet. A thermocouple within the curing block indicates a maximum temperature of about 134°C. is reached and the cured composite foam has a density of 1.4 pounds per cubic foot. The foam block is aged for about one week at ambient temperature and the following test data obtained by dissection of a portion of the block: percent volume of polyurethane foam-90.5; percent volume of styrene/acrylonitrile-9.5; styrene/acrylonitrile foam particle density-1.2 pounds per cubic foot; resiliency of the styrene/acrylonitrile foam particles in 86 percent. Behavior of the composite foam in compression is obtained in the manner of Example 2 and the results are set forth in Table IV which follows.

TABLE IV

| | % COMPRESSION | PRESSURE* |
|---|---|---|
| First Compression Cycle | 25 | 0.77 |
| | 50 | 1.85 |
| | 60 | 3.0 |
| | 70 | 4.7 |
| 100th Compression Cycle | 25 | 0.65 |
| | 50 | 1.52 |
| | 60 | 2.60 |
| | 70 | 4.20 |

*Pounds per square inch

Comparison of the foregoing data with that from a composite foam prepared from a copolymer of styrene containing 0.5 percent divinylbenzene indicates substantially poorer resilience than with the styrene/acrylonitrile polymer composite.

EXAMPLE 4

A copolymer of 29 weight percent acrylonitrile and 71 weight percent styrene having a molecular weight of about 260,000 is melt-blended with 0.4 part per hundred of the diglycidyl ether of bisphenol A in a Brabender mixer and extruded into one millimeter strands which are cut to one millimeter in length. A mass of the particulate polymer is placed in a pressure vessel and contacted with 19.7 parts per hundred, based on the resin, of a 1:1 by weight mixture of difluorodichloromethane and trichlorofluoromethane in the presence of about 2 to 3 weight percent borontrifluoride (based on the total weight of substituted methanes) sufficient to catalyze the cross-linking action of the diglycidyl ether of bisphenol A. The impregnation is done at 120°C. for a period of 24 hours. The resultant particles have a swelling ratio in dimethylformamide of 20.2. Exposure of the blowing agent-impregnated particles in a hot air oven at 150°C. shows $V_F/V_S$ of 40, 60, 68, 64 and 63 after periods of 1, 5, 10, 20 and 30 minutes, respectively. Ten cycles resilience values are obtained as set forth in Example 1 and the results are 82, 85, 83, 80 and 71 for 1, 5, 10, 20 and 30 minute exposures, respectively. A composite polyurethane foam is prepared in the manner of the previous example using the following urethane foam formulation, values given are parts by weight:

| | |
|---|---|
| Polypropylene oxide triol (about 3000 molecular weight) | 59.50 |
| Water | 2.40 |
| Trichlorofluoromethane | 7.15 |
| Stannous Octoate | 0.30 |
| Triethylene diamine | 0.07 |
| Silicone surfactant (DC 192) | 0.40 |
| Toluene diisocyanate | 30.18 |

A composite foam is prepared using 88 parts by weight of the urethane components and 12 parts by weight of the foamable particles, a maximum exotherm temperature of 130°C., overall foam density of 1.46 pounds per cubic foot. The foam is aged for a period of 1 week at room temperature and the following information is obtained: volume percent of the polyurethane foam-79.5 percent; the styrene/acrylonitrile bead is 20.5 volume percent; the bead foam density is 0.94 pound per cubic foot and the bead foam resiliency 10 compression cycles is 81. And 8 inch diameter, 3 inch thick sample of foam is subjected to compression testing using the general apparatus described in Example 2 wherein the foam is first compressed to 30 percent of initial thickness, then compressed for 10 minutes to 10 percent of the initial thickness, permitted to recover for 10 minutes and the cycle repeated. The results are set forth in Table V which follows.

TABLE V

| | % COMPRESSION | PRESSURE* |
|---|---|---|
| First Compression Cycle | 25 | 1.2 |
| | 50 | 3.2 |
| | 60 | 5.3 |
| | 70 | 9.1 |
| Compression after crushing to 10% initial thickness for 10 minutes | 25 | 1.0 |
| | 50 | 2.80 |
| | 60 | 4.5 |
| | 70 | 7.9 |

*Pounds per square inch

EXAMPLE 5

A copolymer of 25 weight percent acrylonitrile and 75 weight percent styrene containing about 0.025 weight percent divinylbenzene is prepared by suspension polymerization in water containing 0.2 weight percent hydroxypropyl methyl cellulose as a suspension stabilizer. Twenty-six weight percent trichlorotrifluoroethane, based on the weight of the monomer, is present, as is 0.156 part by weight benzoyl peroxide, as well as 0.1 weight percent t-butylperbenzoate. The oil to water ratio by weight is 1:1. In the water phase there is dissolved 10 parts per million of sodium nitrite and 50 parts per million potassium dichromate. Polymerization is carried out for 7 hours at a temperature of 80°C. and for 12 hours at 120°C. Gentle agitation is maintained during polymerization. The product is screened and particles retained which have an average diameter of 0.95 ± 0.14 millimeter. A composite foam is prepared having 86.9 parts by weight of an open cell polyurethane foam and 13.1 parts by weight of the styrene/acrylonitrile beads. The polyurethane composition employs 100 parts by weight of poly(propylene oxide)triol having a molecular weight of about 3800; 3.3 parts by weight water; 1 part by weight of a silicone surfactant commercially available under the trade designation of L-520 silicone polyether ester from Union Carbide Co.; 0.1 part by weight of bis-(2-dimethylaminoethyl)ether; 0.225 part by weight stannous octoate, and 37.8 parts by weight of toluene diisocyanate. The urethane components are held at a temperature of 72°F. and mixed with the expandable styrene/acrylonitrile particles, pouredd into a mold measuring about 16×16×20 inches. Maximum temperature within the body during cure as determined by an embedded thermocouple is 127°C. After curing, a composite foam block is removed from the mold and the volume fraction of beads determined to be 19 volume percent. The composite foam has a density of 2.27 pounds per cubic foot. The density of the styrene/acrylonitrile expanded beads in 1.66 pounds per cubic foot. The pressure required to maintain a 25 percent reduction in thickness of the foam is 1 pound per square inch; for a 50 percent reduction in thickness, 4 pounds per square inch, and for 65 percent reduction in thickness a pressure of 10.4 pounds per square inch. Expanded styrene/acrylonitrile beads are removed from a portion of the foam and at room temperature compressed to 20 percent of their original diameters, released and permitted to expand and re-compressed to 20 percent of their original thickness for a total of 10 cylces. After completion of the tenth cycle, particles recover to 84 percent of their original uncompressed diameter. A portion of the foam is heated in air for a period of 6 hours at a temperature of 135°C. After cooling to ambient temperature, the expanded styrene/acrylonitrile beads occupy 33.4 volume percent of the foam and the density of the expanded particles is 0.87 pound per cubic foot. Resiliency of the beads after 10 cycles of 80 percent compression; that is, compression to 20 percent of the original diameter is 84 percent. The composite foam requires 2.1 pounds per square inch to achieve a 25 percent decrease in thickness; 8.8 pounds per square inch for a 50 percent decrease in thickness, and 16.4 pounds per square inch to obtain a 65 percent reduction in thickness.

EXAMPLE 6

The general procedure of Example 5 is repeated with the exception that 80.1 parts of urethane composition are employed with 19.9 parts by weight of the expandable styrene/acrylonitrile beads. The maximum temperature within the composite foam when curing is observed to be 114°C. The composite foam is removed from the mold as 17.3 volume percent of the expanded styrene/acrylonitrile particles and shows an overall density of 2.66 pounds per cubic foot. The density of the expanded styrene/acrylonitrile particles is 3.05 pounds per cubic foot, and the density of the urethane foam, 2.59 pounds per cubic foot. Evaluation of expanded styrene/acrylonitrile beads taken from the foam indicates a resiliency of 74 percent, while the composite foam required 1 pound per square inch to compress to 75 percent of the original thickness; 4.4 pounds per square inch to compress to 50 percent of the original thickness, and 13.2 pounds per square inch to compress to 35 percent of the original thickness. A portion of the foam is heated in air for a period of 3 hours at 135°C., the composite foam subsequently cooled to ambient temperature. The expandable styrene/acrylonitrile beads or particles occupy 48.5 volume percent of the foam. The foam has an overall density of 2.34 pounds per cubic foot. The styrene/acrylonitrile particles have a density of 0.96 pound per cubic foot and the urethane foam portion a density of 3.57 pounds per cubic foot. Evaluation of the styrene/acrylonitrile particles from the heated foam shows 82 percent recovery after ten cycles. The foam requires 3.05 pounds per square inch to compress to 75 percent of its original thickness, 15 pounds per square inch to compress to 50 percent of its original thickness, and 26.4 pounds per square inch to compress to 35 percent of its original thickness.

The swelling ratios of the expandable styrene/acrylonitrile particles employed in Examples 2–6 is between 10 and 50.

All literature and patents cited herein are herewith incorporated by reference thereto.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is hereinafter set forth in the claims.

What is claimed is:

1. A composite foam structure, the composite foam structure being prepared by
   an improved method for the preparation of composite foam materials wherein a self-reacting exothermic open cell flexible urethane foam forming composition is admixed with a particulate closed cell foam forming component and the composite cast or molded into a desired configuration, with the particulate component expanding or foaming during casting or molding, the improvement which comprises
   employing as the closed cell foaming or expanding component a plurality of expandable styrene/acrylonitrile particles, the particles being a polymer of from about 8 to 40 weight percent acrylonitrile and from about 92 to 60 weight percent styrene, the particles having a volatile fluid foaming agent that is a poor solvent for the polymer and boils at a temperature below about 110°C., the unexpanded particles having a swelling ratio of from about 10 to 50 at 25°C. as determined in dimethylformamide and forming a coherent gel.

2. The composite foam structure of claim 1 wherein the method of preparation includes the step of providing a self-reacting exothermic open cell foam forming composition which foams to a density of from about 0.8 to 3 pounds per cubic foot.

3. The composite foam structure of claim 1 wherein the styrene/acrylonitrile particles are expanded to a density not greater than 3 pounds per cubic foot.

4. The composite foam structure of claim 1 wherein the method of preparation includes the step of providing the styrene/acrylonitrile particles in an amount sufficient to provide from 1 to 15 volume percent of the expanded styrene/acrylonitrile particles.

5. The composite foam structure of claim 1 wherein the method of preparation includes the step of providing the styrene/acrylonitrile particles in an amount sufficient to provide from 1 to 50 volume percent of the expanded styrene/acrylonitrile particles.

6. The composite foam structure of claim 1 wherein the method of preparation includes the step of providing the styrene/acrylonitrile particles in an amount sufficient to provide from 15 to 50 volume percent of the expanded styrene/acrylonitrile particles.

7. The composite foam structure of claim 1 wherein styrene/acrylonitrile particles expand to at least 20 times their unexpanded volume.

8. The composite foam structure of claim 1 wherein the styrene/acrylonitrile particles are a polymer of from about 80 to 70 weight percent styrene and 20 to 30 weight percent acrylonitrile.

9. The composite foam structure of claim 1 wherein the expandable styrene/acrylonitrile particles have a diameter of from about 0.05 to 5 millimeters.

10. The composite foam structure of claim 1 wherein the unexpanded particles have a diameter of from about 0.3 to 3 millimeters.

11. A composite foam structure prepared by an improved method for the preparation of composite foam materials wherein the self-reacting flexible polyurethane open cell foam forming composition is admixed with a particulate closed cell expanding component and the composite cast or molded into a desired configuration, wherein the particulate component is foamed or expanded during the casting or molding, the improvement which comprises employing as the closed cell foaming component a plurality of expandable styrene/acrylonitrile particles, the particles being a polymer of from about 80 to 70 weight percent styrene and from about 20 to 30 weight percent acrylonitrile, the particles expanding to at least 20 times their collapsed volume on exposure to foaming conditions, the particles in unexpanded form having a swelling ratio of from about 10 to 50 as determined at 25°C. and measured in dimethylformamide, with the further limitation that the swollen polymer forms a coherent gel, the particles having a diameter of from about 0.05 to about 5 millimeters.

12. An improved method for the preparation of composite foam materials wherein a self-reacting exothermic open cell flexible urethane foam forming composition is admixed with a unexpanded closed cell foam forming component and the composite cast or molded into a desired configuration, with the particulate component expanding or foaming during casting or molding, the improvement which comprises employing as the closed cell foaming or expanding component a plurality of expandable styrene/acrylonitrile particles, the particles being a polymer of from about 8 to 40 weight percent acrylonitrile and from about 92 to 60 weight percent styrene, the particles having a volatile fluid foaming agent that is a poor solvent for the polymer and boils at a temperature below about 110°C., the unexpanded particles having a swelling ratio of from about 10 to 50 at 25°C. as determined in dimethylformamide and forming a coherent gel.

13. The method of claim 12 including the step of providing a self-reacting exothermic open cell foam forming composition which foams to a density of from about 0.8 to 3 pounds per cubic foot.

14. The method of claim 12 wherein the styrene/acrylonitrile particles are expanded to a density not greater than 3 pounds per cubic foot.

15. The method of claim 12 including the step of providing the styrene/acrylonitrile particles in an amount sufficient to provide form 1 to 15 volume percent of the expanded styrene/acrylonitrile particles.

16. The method of claim 12 including the step of providing the styrene/acrylonitrile particles in an amount sufficient to provide from 1 to 50 volume percent of the expanded styrene/acrylonitrile particles.

17. The method of claim 12 including the step of providing the styrene/acrylonitrile particles in an amount sufficient to provide from 15 to 50 volume percent of the expanded styrene/acrylonitrile particles.

18. The method of claim 12 wherein the styrene/acrylonitrile particles expand to at least 20 times their unexpanded volume.

19. The method of claim 12 wherein the styrene/acrylonitrile particles are a polymer of from about 80 to 70 weight percent styrene and 20 to 30 weight percent acrylonitrile.

20. The method of claim 12 wherein the expandable styrene/acrylonitrile particles have a diameter of from about 0.05 to 5 millimeters.

21. The method of claim 20 wherein the unexpanded particles have a diameter of from about 0.3 to 3 millimeters.

22. In an improved method for the preparation of composite foam materials wherein the self-reacting flexible polyurethane open cell foam forming composition is admixed with unexpanded particulate closed cell expanding component and the composite cast or molded into a desired configuration, wherein the particulate component is foamed or expanded during the casting or molding, the improvement which comprises employing as the closed cell foaming component a plurality of unexpanded expandable styrene/acrylonitrile particles, the particles being a polymer of from about 80 to 70 weight percent styrene and from about 20 to 30 weight percent acrylonitrile, the particles expanding to at least 20 times their collapsed volume on exposure to foaming conditions, the particles in unexpanded form having a swelling ratio of from about 10 to 50 as determined at 25°C. and measured in dimethylformamide, with the further limitation that the swollen polymer forms a coherent gel, the particles having a diameter of from about 0.05 to about 5 millimeters.

23. An unexpanded expandable synthetic resinous particle particularly suited as a component in a composite foam composition, the expandable particle comprising a styrene/acrylonitrile particle having a volatile fluid foaming agent therein, the volatile fluid foaming agent being a poor solvent for the polymer and boiling below about 110°C., the styrene/acrylonitrile particle being a polymer of from about 92 to 60 weight percent styrene and from about 8 to 40 weight percent acrylonitrile, wherein in its unexpanded form the particle shows a swelling ratio of from about 10 to 50 as determined at 25°C. in dimethylformamide and the particles forming a coherent gel.

24. The particle of claim 23 wherein the closed cell foam particle is of a polymer containing from about 80 to 70 percent styrene and from about 20 to 30 weight percent acrylonitrile.

25. The particle of claim 23 wherein in collapsed form the particle has a diameter of from about 0.05 to about 5 millimeters.

26. The particle of claim 23 wherein in collapsed form the particle has a diameter of from about 0.3 to 3 millimeters.

27. An expanded styrene/acrylonitrile particle having a collapsed diameter of from about 0.5 to about 5 millimeters and being expanded to at least about 20 times the volume of the collapsed (or cell-free) volume, the styrene/acrylonitrile polymer being a polymer of from about 80 to 70 weight percent styrene and from about 20 to 30 weight percent acrylonitrile, the polymer having a swelling ratio of from about 10 to 50 as measured at 25°C. in dimethylformamide and forming a coherent gel.

28. An improved method for the preparation of composite foam materials wherein a self-reacting exothermic open cell flexible urethane foam forming composition is admixed with a particulate closed cell foam forming component and the composite cast or molded into a desired configuration, with the particulate component expanding or foaming during casting or molding, the improvement which comprises employing as the closed cell foaming or expanding component a plurality of expandable styrene/acrylonitrile particles, the particles having a diameter of from about 0.05 to 5 millimeters, the particles being a polymer of from about 20 to 30 weight percent acrylonitrile and from about 80 to 20 weight percent styrene, the particles having a volatile fluid foaming agent that is a poor solvent for the polymer and boils at a temperature below about 110°C., the unexpanded particles having a swelling ratio of from about 10 to 50 at 25°C. as determined in dimethylformamide and forming a coherent gel, the self-reacting exothermic open cell foam forming composition foaming to a density of from about 0.8 to 3 pounds per cubic foot, the styrene/acrylonitrile particles expanding to a density not greater than 3 pounds per cubic foot and to at least 20 times their original unexpanded volume, including the further step of providing the styrene/acrylonitrile particles in an amount sufficient to provide from 1 to 15 volume percent of the expanded styrene/acrylonitrile particles.

* * * * *

PO-1050
(5/69)

UNITED STATES PATENT OFFICE
CERTIFICATE OF CORRECTION

Patent No. 3,878,133      Dated April 15, 1975

Inventor(s) Louis C. Rubens

It is certified that error appears in the above-identified patent and that said Letters Patent are hereby corrected as shown below:

Column 2, line 8, the word "commposition" should be --composition--.

Column 2, line 43, the word "plicaations" should be --plications--.

Column 3, line 42, the word --be-- should be inserted between the words "may" and "employed".

Column 4, line 19, the word "introdducing" should be --introducing--.

Column 4, line 33, insert the word --the-- between "in" and "poly-".

Column 5, line 8, the word "/arrylonitrile" should be --/acrylonitrile--.

Column 7, line 37, the word "shown" should be --show--.

Column 8, line 17, in Table II, there should be an asterisk after the word "PRESSURE" so that it reads --PRESSURE*--.

Column 8, line 43, the words "ration in" should be --ratio is--.

Column 9, line 4, the word "utiized" should be --utilized--.

Column 9, line 28, the word "in" should be --is--.

Column 9, line 48, the number "0.5" should be --0.05--.

Column 11, line 16, the word "pouredd" should be --poured--.

PO-1050
(5/69)

UNITED STATES PATENT OFFICE
CERTIFICATE OF CORRECTION

Patent No. 3,878,133　　　　　　Dated April 15, 1975

Inventor(s) Louis C. Rubens　　　　　Page - 2

It is certified that error appears in the above-identified patent and that said Letters Patent are hereby corrected as shown below:

Column 11, line 24, the word "in" should be --is--.

Column 11, line 67, the word "required" should be --requires--.

Column 13, line 52, insert the word --particulate-- between the words "a" and "unexpanded".

Column 14, line 10, the word "form" should be --from--.

Column 14, line 43, the word "unexpended" should be --unexpanded--.

Signed and Sealed this twenty-ninth Day of July 1975

[SEAL]

Attest:

RUTH C. MASON
*Attesting Officer*

C. MARSHALL DANN
*Commissioner of Patents and Trademarks*